June 6, 1961 C. D. SPICER 2,986,845
TUBE CRACK-OFF MACHINE
Filed Feb. 13, 1958 2 Sheets-Sheet 1

Inventor:
Curtis D. Spicer,
by Otto Tichy
His Attorney.

June 6, 1961  C. D. SPICER  2,986,845
TUBE CRACK-OFF MACHINE
Filed Feb. 13, 1958  2 Sheets-Sheet 2

Inventor:
Curtis D. Spicer,
by Otto Tichy
His Attorney.

United States Patent Office 2,986,845
Patented June 6, 1961

2,986,845
TUBE CRACK-OFF MACHINE
Curtis D. Spicer, Cleveland Heights, Ohio, assignor to General Electric Company, a corporation of New York
Filed Feb. 13, 1958, Ser. No. 715,020
4 Claims. (Cl. 49—50)

The present invention relates to machines for subdividing lengths of small diameter glass tubing.

In the manufacture of electric lamps, such as incandescent lamps, large numbers of short length glass tubes, such as tubes one and one-half inches up to and including six inches in length, are used. Such tubes are useful as exhaust tubes for the glass envelopes of such lamps, and as supports inside the lamp envelope for the incandescent filament. Electric lamps are fabricated on high-speed, precision machines which assemble the various parts of the lamp. In order to make possible the use of such high-speed precision lamp making machinery the various components of the lamp must conform to accurate specifications.

The principal object of the present invention is to provide a machine for subdividing long lengths of glass tubing into the required short lengths for use in lamp making machines and at an extremely high rate of speed. A further object of the invention is to provide a machine of this kind which requires a minimum of factory floor space and minimum of maintenance and supervision for its operation. Further objects and advantages of the invention will appear from the following description of a species thereof and from the accompanying drawings.

A feature of the invention is a positive-acting, long-lasting means including a plurality of water wheels mounted on and in floating engagement with a driven shaft for fracturing the lengths of glass tubing by thermal shock immediately after the tubing has been heated in annular zones spaced along the length thereof. The fracturing means is self-adjusting to slight variations in tubing diameter.

In the drawings accompanying and forming part of this specification a machine embodying the invention is shown in which:

FIG. 3 is a sectional, fragmentary view of the machine taken in the direction of the arrows along the line 3—3 of FIG. 1.

Figure 1:
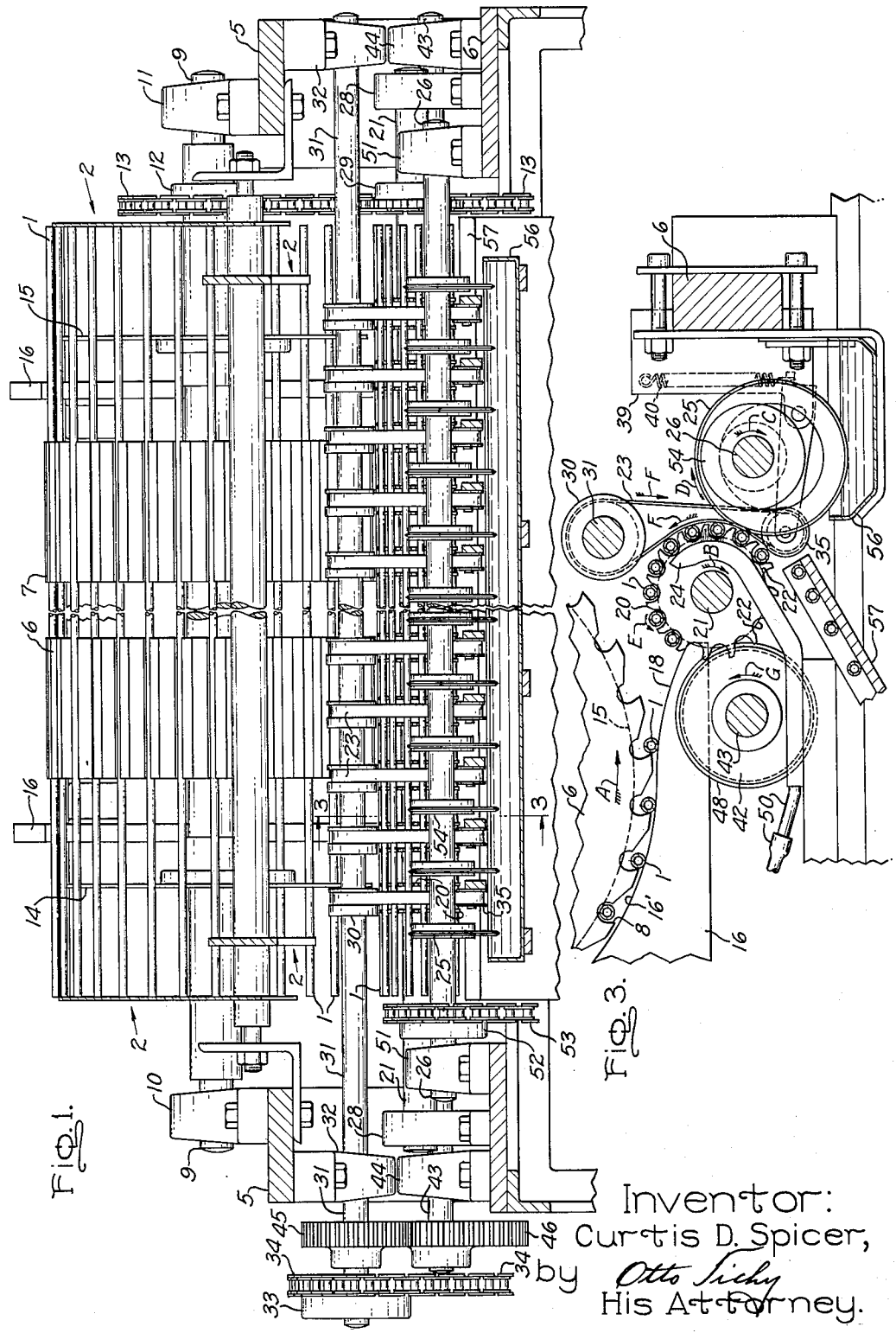
FIG. 1 is a front elevation of the machine with various parts including opposite end parts thereof being shown partly in section.
Figure 2:
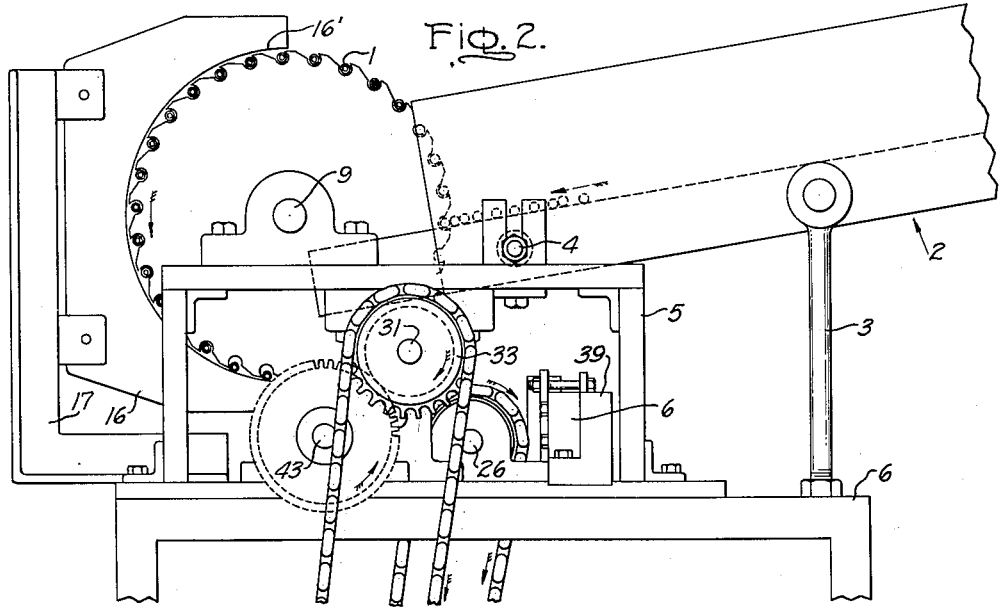
FIG. 2 is an end elevation of the machine as viewed from the left of FIG. 1 showing the feed mechanism of the machine.

Referring to FIGS. 1 and 2 of the drawing, lengths of glass tubing 1, which may be fifty inches or more in length and up to one-quarter inch in diameter, to be subdivided by the machine are fed from a supply placed in a single layer on a chute 2 supported in a sloping position by supports 3 and 4 attached to the frame members 5 and 6 of the machine. Hereinafter the lengths of tubing 1 are designated as canes for convenience. The canes 1 move down the chute by gravity toward a pair of horizontal, spaced feeder rolls 6 and 7 having a series of notches 8 at their peripheries with the notches in the respective rolls aligned so that the canes disposed in corresponding notches in the respective rolls 6 and 7 are supported in a horizontal position. Successive canes drop into successive notches in the rolls as the latter rotate. The rolls are keyed to a shaft 9 which is mounted for rotation on bearings in housings 10 and 11 secured to brackets 5 on the main frame 6 of the machine. The shaft 9 is driven by the gear 12 affixed to the shaft and the chain 13 shown at the right of FIG. 1 and FIG. 4. The chain is connected to a driving means (not shown) of the machine. A pair of discs 14 and 15 (FIG. 1) is also affixed to the shaft 9 outwardly of the rolls 6 and 7 so as to rotate therewith and support the outer ends of the canes 1 as they are transported in a circular path by the rolls. The discs 14 and 15 have been omitted from FIGS. 2 and 3 for clarity of illustration.

Each cane travels in the direction of the arrow A (FIG. 2) and eventually falls out of the notches in the feeder rolls upon a guideway comprising a plurality of spaced identical members 16 each affixed to the frame by brackets 17 (FIGS. 1 and 2). These members 16 have curved portions 16' (FIG. 2) which hold the canes in the notches as the canes are carried by the rolls and also have downwardly sloping extensions 18 (FIG. 3) extending from the bottom of the rolls. The canes falling out of the notches at the bottom of the rolls thus travel by gravity along the guideway extensions 18 toward the subdividing mechanism of the machine.

Figure 4:
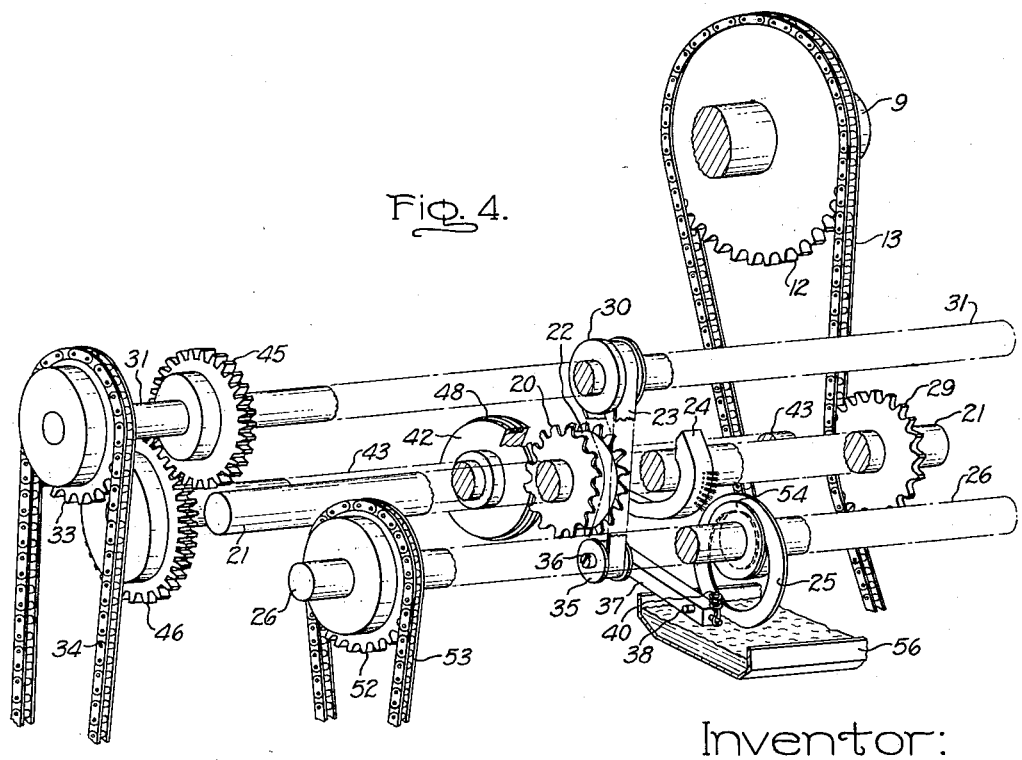
FIG. 4 is a fragmentary, schematic representation of the machine illustrated in FIGS. 1, 2 and 3.

The subdividing mechanism of the machine, the essential parts of which are shown in FIG. 4, includes a plurality of notched discs 20 mounted on shaft 21 for carrying the canes in a horizontal position along a circular path of small diameter, means including a plurality of driven rollers 22 and belts 23 cooperating to rotate the carried canes on their longitudinal axes, means including a plurality of spaced burners 24 for heating annular zones of the conveyed rotating canes and means to immediately thereafter thermally shock the glass in the heated annular zones to crack the canes simultaneously at said zones and thereby subdivide the canes into short length sections. The last-named means includes a plurality of water wheels 25 freely floating on a shaft 26 and lightly touching the canes at the heated zones thereof.

The notched discs 20 are keyed to the shaft 21 which is mounted in bearings contained in housings 28 fastened to the main frame 6 of the machine as shown in FIG. 1. The shaft 21 is driven through the gear 29 which is engaged by the drive chains 13 for the shaft 9 of the feeder rolls 6 and 7. The arrangement of the driving means for the shafts 9 and 21 is such that the feeder rolls 6 and 7 and the notched discs 20 are synchronized in their rotation so that the fed canes leaving the feeder rolls are accommodated immediately in notches in the discs so that the canes do not collect on the guideway extensions and jam the machine.

The canes enter the notches in the discs 20 above the level of the axis of rotation of the shaft 21 as shown in FIG. 3 and are held in the notches by gravity as the notched discs rotate in the direction of the arrow B to carry the canes in a circular path from the back toward the front of the machine and over the rotational axis of the shaft 21. The sides of the notches in the spaced discs 20 are spaced apart sufficiently to allow the canes to be rotated on their longitudinal axes in the notches while being carried by the discs.

The belts 23 included with the driven rollers 22, in the means for rotating the canes 1 on their longitudinal axes are mounted in front of the rollers 22 and engage the canes as they are carried in a downward direction by the notched discs 20. The belts 23 thus hold the canes within the notches of the discs 20. The belts 23 are driven by flanged sheaves 30 affixed to the shaft 31 which is mounted in bearings contained in housings 32 fastened to the brackets 5 attached to the main frame 6 of the machine as shown in FIG. 1. The shaft 31 is driven through the gear 33 and the chain 34 connecting the shaft 31 to a drive means (not shown) of the machine independent of the drive for shafts 9 and 21. The belts 23 are held taut by the sheaves 35 mounted for rotation on spindles 36 affixed to the ends of arms 37 pivoted at 38 on the brackets 39 (FIGS. 2 and 3) affixed to the main frame 6 of the machine. The pivoted arms 37 are provided with tension springs 40 (FIGS. 3 and 4) on the side of their pivots 38 away from the sheaves 35 to urge the sheaves 35 in a downward direction away from sheaves 30 and thus keep the belts 23 taut so as to frictionally engage and hold the canes in the notched discs 20.

The driven rollers 22 cooperating with the belts 23 to rotate the canes as described above are ball bearings having their inner races affixed to the shaft 21 between the notched discs and with their outer races free to rotate with respect to the shaft. The diameter of the driven rollers 22 is slightly greater than the diameter of the notched discs 20 at the bottom of the notches so that the canes urged inwardly of the notches by the belts 23 engage the outer races of the rollers 22 and are held away from the bottom of the notches so that the canes may be rotated freely in the notches by the driven belts and rollers.

The drive means for the rollers comprises a plurality of drive wheels 42, one for each of the rollers, which wheels are affixed to the shaft 43 so as to rotate therewith. The shaft 43 is mounted in bearings contained in housings 44 affixed to the main frame 6 of the machine as shown in FIG. 1 and is driven in synchronism iwth the shaft 31 for the belts 23 through the gears 45 and 46 attached to the shaft 31 and the shaft 43 respectively, as shown in FIGS. 1 and 4.

The drive wheels 42 are provided with rings 48 of friction material at their peripheries whcih rings frictionally engage the outer races of the rollers 22 as shown in FIGS. 3 and 4. The speed of the belts and the peripheral speed of the outer races of the driven rollers is so controlled through the wheels 42 and the gears 45 and 46 that substantially no slippage between these elements and the canes 1 engaged thereby occurs during operation of the machine. This reduces wear on the belts, particularly.

The above-described components of the subdividing mechanism of the machine carry the canes in a horizontal position in a circular path while rotating the canes around their longitudinal axes with the belts engaging the canes through an angular distance of approximately 30 to 50 degrees of their circular path and symmetrical with a horizontal plane including the axis of rotation of the shaft 21.

The means for heating the canes as they are carried and rotated as described above includes the stationary air-gas burners 24 (FIGS. 3 and 4) which extend from the back toward the front of the machine with their front ends located between the notched discs and curving around the shaft 21 so as to direct the narrow flames produced thereby against the inner sides of the canes as the latter are carried across the faces of the burners by the notched discs 20. The jets in the burner faces extend in a curved line an angular distance of approximately 30° around the rotational axis of the shaft 21 and symmetrical with a horizontal plane including the said axis so that the flames produced by the burners heat the canes in narrow annular spaced apart zones as the canes are carried across the faces of the burners. The burners are fed in the usual manner through the usual conduits 50 shown in FIG. 3 of the drawing.

As a result of this heating, strains are set up in the heated zones of the canes which are quickly reversed to fracture the canes in the heated zones thereof when cooled by the means including the water wheels 25.

The water wheels are constructed and arranged to lightly contact the heated zones of the canes immediately after the canes have left the part of their circular path of movement covered by the flames produced by the burners 24. This is highly advantageous in producing the maximum thermal shock at the parts of the cane to be fractured or cracked by the thermal shock imparted thereto by the water wheels and also to minimize the possibility of endwise shifting of the canes in their travel between the flames and the water wheels.

The water wheels 25 are constituted by thin annular metal rings, of stainless steel, for example, bevelled at their outer peripheries and flat at their outer rims so as to make a short line contact with the canes. The wheels 25 are loosely mounted on the shaft 26. The shaft 26 is mounted in bearings contained in housings 51 affixed to the main frame of the machine as shown in FIG. 1 and is driven through the gear 52 and the chain 53 connected to a drive motor (not shown) of the machine. The rings 25 are held in spaced positions longitudinally of the shaft by collars 54 affixed to the shaft 26 and arranged in pairs, one pair for each of the rings 25. The collars 54 for each ring are spaced apart sufficiently to merely position the rings and it is not desirable that the collars make a tight fit with the rings but on the contrary permit the rings to rotate freely on the shaft as the latter is rotated by the drive means described above. The shaft 26 is so positioned with respect to the other components of the machine that when the machine is idle the outer peripheries of the rings are contiguous with the outer boundary of the path followed by the canes carried by the notched discs 20. When the machine is operating, the shaft 26 and therewith the rings 25 are rotated in the direction of the arrows C and D (FIG. 3) so that the rings tend to shift laterally on the shaft toward the canes and lightly engage the canes as the latter are carried along their circular path by the discs 20. The wheels 25 are thus self-adjusting on the shaft to any minor variations in the diameter of the canes.

The machine comprises also a water bath 56 into which the lower parts of the rings dip as shown in FIGS. 1, 3 and 4. The elongated pan of the water bath is secured to the main frame 6 of the machine as shown in FIG. 3. As the water wheels 25 are rotated in the direction indicated by the arrow D in FIG. 3, the outer peripheries of the wheels travel directly from the water bath to the canes without first passing through the hot zone created at the top of the wheels by the burners 24. If the direction of rotation of the wheels were reversed, the wet rims of the wheels would have to pass through the hot zone created by the burners before the canes were touched. This would dry the wheels before the latter touched the canes and the canes would not be cracked.

In the operation of the machine the canes are cracked immediately upon coming into contact with the water wheels and the segments thereof are held by the belts 23 against the rollers 22 and in the notches of the notched discs 20 on either side of each of the rollers (FIG. 4) until the idler sheave 35 is passed, whereupon the segments of the cracked canes drop out of the notches in the discs 20 and fall upon the chute 57 (FIG. 3) and travel by gravity down the chute away from the machine. Any parts of the cane which are not immediately cracked on contact with the water wheels are sufficiently fractured thereby so that the shock resulting from being dropped on the chute completes the cracking of the canes. The chute may direct the canes to a conventional conveyor or other means for removing the cane segments away from the machine to be annealed in the usual manner.

It will be noted particularly from FIG. 3 of the drawing and looking at the machine in the direction in which FIG. 3 is taken, that the water wheels are rotated in a clockwise direction as indicated by arrow D and that the canes are rotated on their longitudinal axes in an anti-clockwise direction as indicated by the arrow E. The direction of rotation of the belts 23 is indicated by the arrows F. The outer races of the rollers 22 are driven in a clockwise direction by the drive wheels 42 which rotate in an anti-clockwise direction as indicated by the arrow G. The speed of rotation in opposite directions of the peripheral portions of the canes and the water wheels are correlated so that there is no relative movement between their ever changing parts in contact with each other to minimize wear on the wheels.

While a species of the machine has been shown and described, it will be understood, of course, that numerous changes in the form and details may be made without departure from the scope of the invention as defined in the appended claims and that the machine may be used to subdivide canes into various lengths by adjusting the spaces between the notched discs, the rollers, the belts and the water wheels and by adding or subtracting the number of these components mounted on the various shafts and that the canes to be subdivided may be lengths of solid cylindrical glass rods as well as lengths of hollow glass tubing.

What I claim as new and desire to secure by Letters Patent of the United States is:

1. A machine for subdividing glass canes comprising in combination, a horizontally disposed shaft mounted for rotation on its longitudinal axis, a plurality of water wheels mounted in longitudinally spaced positions along said shaft and in floating engagement therewith, drive means for continuously rotating said shaft on its longitudinal axis in a single direction to shift said wheels toward one side of said shaft, conveyor means for carrying a series of glass canes in a direction transverse to the shaft and the conveyed canes and for advancing the said canes against the outer rims of the wheels at the side of the shaft towards which the wheels are shifted by the drive means, and a plurality of heater means for the conveyed canes, said heater means being mounted along the path of the conveyed canes and at a location close to and directly ahead of the wheels, said machine comprising also cane rotating means mounted along the path of the conveyed canes and positioned to engage the said canes as the canes are advanced into heat receiving relation to the heating means and against the wheels, means for driving the cane rotating means in a direction to rotate the canes on their axes in a direction opposite the direction of rotation of said wheels, and means interconnecting the drive means for said cane rotating means and the drive means for the shaft rotating means and correlating the peripheral speed of the canes and the wheels to avoid relative movement between the everchanging contacting parts of said canes and said wheels.

2. A machine for subdividing glass canes comprising in combination, a horizontally disposed shaft mounted for rotation on its longitudinal axis, a plurality of water wheels mounted in longitudinally spaced positions along said shaft and in floating engagement therewith, drive means for continuously rotating said shaft on its longitudinal axis in a single direction to shift said wheels toward one side of said shaft, conveyor means for carrying a series of glass canes in a direction transverse to the shaft and the conveyed canes and for advancing the said canes against the outer rims of the wheels at the side of the shaft towards which the wheels are shifted by the drive means, and a plurality of heater means for the conveyed canes, said heater means being mounted along the path of the conveyed canes and at a location close to and directly ahead of the wheels, said machine comprising also cane rotating means mounted along the path of the conveyed canes and positioned to engage the said canes as the canes are advanced into heat receiving relation to the heating means and against the wheels, means for driving the cane rotating means in a direction to rotate the canes on their axes in a direction opposite the direction of rotation of said wheels, and means interconnecting the drive means for said cane rotating means and the drive means for the shaft rotating means and correlating the peripheral speed of the canes and the wheels to avoid relative movement between the everchanging contacting parts of said canes and said wheels, the outer rims of the wheels being flat for making a line contact with the heated portions of the conveyed canes.

3. A machine for subdividing glass canes comprising in combination, a horizontally disposed shaft mounted for rotation on its longitudinal axis, a plurality of water wheels mounted in longitudinally spaced positions along said shaft and in floating engagement therewith, drive means for continuously rotating said shaft on its longitudinal axis in a single direction to shift said wheels toward one side of said shaft, conveyor means for carrying a series of glass canes in a direction transverse to the shaft and the conveyed canes and for advancing the said canes against the outer rims of the wheels at the side of the shaft towards which the wheels are shifted by the drive means, and a plurality of heater means for the conveyed canes, said heater means being mounted along the path of the conveyed canes and at a location close to and directly ahead of the wheels, said machine comprising also cane rotating means mounted along the path of the conveyed canes and positioned to engage the said canes as the canes are advanced into heat receiving relation to the heating means and against the wheels, means for driving the cane rotating means in a direction to rotate the canes on their axes in a direction opposite the direction of rotation of said wheels, and means interconnecting the drive means for said cane rotating means and the drive means for the shaft rotating means and correlating the peripheral speed of the canes and the wheels to avoid relative movement between the ever-changing contacting parts of said canes and said wheels, the said conveyor means comprising a shaft mounted parallel with the wheel supporting shaft and on the side of the wheel supporting shaft toward which the said wheels are shifted by the drive means for said wheel supporting shaft and a plurality of discs mounted on said conveyor shaft in longitudinally spaced positions and provided with cane accommodating notches at their peripheries, said machine comprising also drive means for said conveyor shaft for rotating said shaft in the same direction as said wheel supporting shaft, the outer rims of the wheels being flat for making a line contact with the heated portions of the conveyed canes.

4. A machine for subdividing glass canes comprising in combination, a horizontally disposed shaft mounted for rotation on its longitudinal axis, a plurality of water wheels mounted in longitudinally spaced positions along said shaft and in floating engagement therewith, drive means for continuously rotating said shaft on its longitudinal axis in a single direction to shift said wheels toward one side of said shaft, conveyor means for carrying a series of glass canes in a direction transverse to the shaft and the conveyed canes and for advancing the said canes against the outer rims of the wheels at the side of the shaft towards which the wheels are shifted by the drive means, and a plurality of heater means for the conveyed canes, said heater means being mounted along the path of the conveyed canes and at a location close to and directly ahead of the wheels, said machine comprising also cane rotating means mounted along the path of the conveyed canes and positioned to engage the said canes as the canes are advanced into heat receiving relation to the heating means and against the wheels, said cane rotating means including a plurality of belts mounted in alternation with said heater means and said wheels and extending along one side of the path of the conveyed canes and a plurality of rollers mounted on the opposite side of the said path, said belts and said rollers being mounted in opposed positions with respect to each other for frictionally engaging therebetween the conveyed canes, means for rotating said rollers and means for driving said belts to rotate the conveyed canes on their axes in a direction opposite the direction of rotation of said wheels and means interconnecting the means for rotating said rollers, the means for driving said belts and the drive means for the shaft supporting said wheels and correlating the peripheral speed of the conveyed canes, the rollers and the wheels and the speed of the belts to minimize relative movement between the ever changing parts of the conveyed rotated canes and the rollers, the belts and the wheels engaging the canes, the outer rims of the wheels being flat for making a line contact with the heated portions of the conveyed canes.

References Cited in the file of this patent

UNITED STATES PATENTS

| | | |
|---|---|---|
| 1,869,362 | Ackerman | Aug. 2, 1932 |
| 2,167,589 | Schutz | July 25, 1939 |
| 2,310,469 | Snyder | Feb. 9, 1943 |
| 2,323,182 | Stuckert | June 29, 1943 |
| 2,427,712 | Casler et al. | Sept. 23, 1947 |
| 2,546,887 | Dalrymple | Mar. 27, 1951 |

FOREIGN PATENTS

| | | |
|---|---|---|
| 21,635 | Great Britain | Dec. 11, 1902 |